United States Patent
Blink et al.

(10) Patent No.: US 6,960,988 B2
(45) Date of Patent: Nov. 1, 2005

(54) MULTI-FUNCTION CUSTOMER SATISFACTION SURVEY DEVICE

(75) Inventors: Russell P. Blink, Plano, TX (US); Kenneth J. Lovegreen, Lake Kiowa, TX (US); James A. Henderson, Duncanville, TX (US)

(73) Assignee: Long Range Systems, Inc., Dallas, TX (US)

( * ) Notice: Subject to any disclaimer, the term of this patent is extended or adjusted under 35 U.S.C. 154(b) by 606 days.

(21) Appl. No.: 09/882,457

(22) Filed: Jun. 14, 2001

(65) Prior Publication Data

US 2002/0194072 A1 Dec. 19, 2002

(51) Int. Cl.[7] .............................................. G06F 17/60
(52) U.S. Cl. .................... 340/286.09; 340/321; 705/10; 705/15; 705/21; 362/154; 362/84; 362/98; 362/234; 362/253; 178/18; 439/246; 235/419; 235/420
(58) Field of Search ................. 705/10, 15, 21; 340/286.09, 321; 178/18; 362/154

(56) References Cited

U.S. PATENT DOCUMENTS

| | | | | |
|---|---|---|---|---|
| D254,944 S | | 5/1980 | Lee et al. ..................... D6/181 |
| 4,882,675 A | * | 11/1989 | Nichtberger et al. .......... 705/14 |
| D333,743 S | | 3/1993 | Johnson ....................... D6/449 |
| 5,237,157 A | * | 8/1993 | Kaplan ........................ 235/375 |
| 5,288,565 A | * | 2/1994 | Gruenstern .................. 429/153 |
| 5,355,115 A | * | 10/1994 | Goor et al. .................. 340/321 |
| 5,587,560 A | * | 12/1996 | Crooks et al. ........... 178/18.03 |
| 5,813,748 A | * | 9/1998 | Maxymych .................. 362/154 |
| 5,814,968 A | * | 9/1998 | Lovegreen et al. .......... 320/113 |
| 5,859,628 A | * | 1/1999 | Ross et al. ................... 345/173 |
| 5,893,075 A | * | 4/1999 | Plainfield et al. ............. 705/14 |
| 6,014,316 A | * | 1/2000 | Eide ........................... 361/735 |
| 6,076,079 A | * | 6/2000 | Boston et al. .............. 705/400 |
| 6,310,783 B1 | * | 10/2001 | Winch et al. ................ 361/797 |
| 6,380,928 B1 | * | 4/2002 | Todd .......................... 345/169 |
| 2002/0107717 A1 | * | 8/2002 | Liu et al. ...................... 705/10 |

FOREIGN PATENT DOCUMENTS

EP          1059599      * 12/2000     .................. 705/10

OTHER PUBLICATIONS

"Freebies and Other Kid Friendly Frills", Hayes, Nation's Restaurant's, Jan. 1996.*

* cited by examiner

Primary Examiner—Joseph A. Fischetti
(74) Attorney, Agent, or Firm—Steven W. Smith

(57) ABSTRACT

A multi-function customer satisfaction survey device, system and method. A plurality of stackable tip trays in a restaurant each include a survey device and a calculator. Survey questions are presented on a display screen, and a survey keypad is used by the customer to enter responses. The responses are stored in a memory in the tray. The trays stack on a base unit that simultaneously collects the responses from the stacked trays, simultaneously programs the stacked trays with survey questions, and simultaneously recharges a battery in each tray.

8 Claims, 3 Drawing Sheets

MULTI-FUNCTION CUSTOMER SATISFACTION SURVEY DEVICE

BACKGROUND OF THE INVENTION

1. Technical Field of the Invention

This invention relates to data processing systems for gathering and compiling data for management analysis, and more particularly, to a multi-function customer satisfaction survey device that also functions as a restaurant tip tray and calculator.

2. Description of Related Art

U.S. Pat. No. Des. 333,743 to Johnson illustrates the design for a combined restaurant check tray and calculator. The Johnson design is essentially a tray configuration with a keypad in the top surface of the tray, and a numerical display in a frame portion at one end of the tray. Johnson, however, does not teach or suggest combining a customer satisfaction survey device with the illustrated design.

U.S. Pat. No. 5,893,075 to Plainfield et al. discloses a PC-based, interactive, programmable system that induces customers of a restaurant to enter information about themselves or to answer survey questions. The program is run on a PC, and the customer enters the information in data fields displayed on the PC's monitor. Plainfield, however, does not teach or suggest that a computerized survey device could be combined with a restaurant tip tray and calculator.

Restaurant managers have a need to induce customers to answer customer satisfaction surveys so that the managers can identify problem areas and correct them. In addition, the collected information must be compiled quickly and easily into a database that is accessible by the managers. This can be a serious problem when a restaurant chain has many restaurants spread out over a large area. Additionally, customers who are dissatisfied may fill out a paper survey or the survey disclosed in Plainfield, and the restaurant manager may not know of the customer's dissatisfaction until the customer has left the restaurant, perhaps never to return.

It would be advantageous, therefore, to have a survey device that overcomes these disadvantages. The present invention provides such a device.

SUMMARY OF THE INVENTION

In one aspect, the present invention is a multi-function customer satisfaction survey device that includes a tip tray for holding a customer's payment for food in a restaurant, and means within the tray for obtaining and storing responses from the customer regarding a level of customer satisfaction. The device may also include a calculator within the tray.

In another aspect, the present invention is a system for obtaining and storing responses from a customer regarding a level of customer satisfaction. The system includes a tip tray that includes means within the tray for obtaining and storing responses from the customer regarding the level of customer satisfaction, and a base unit that collects the responses from the tray. The tray may also include a calculator. A plurality of trays may be stacked on a single base unit for simultaneously recharging a battery in each tray. The stacked trays may also be simultaneously programmed with survey questions, and data can be simultaneously downloaded from all of the stacked trays.

In yet another aspect, the present invention is a method of obtaining and storing responses from a customer regarding a level of customer satisfaction. The method includes the steps of presenting customer survey questions to the customer on a display screen mounted in a tip tray; collecting the customer's responses to the survey questions with a survey keypad mounted in the tip tray; and storing the customer responses in a memory in the tip tray. The stored responses may further be downloaded to a database. The method may also include offering the customer a chance to win a prize in exchange for participating in the customer satisfaction survey.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
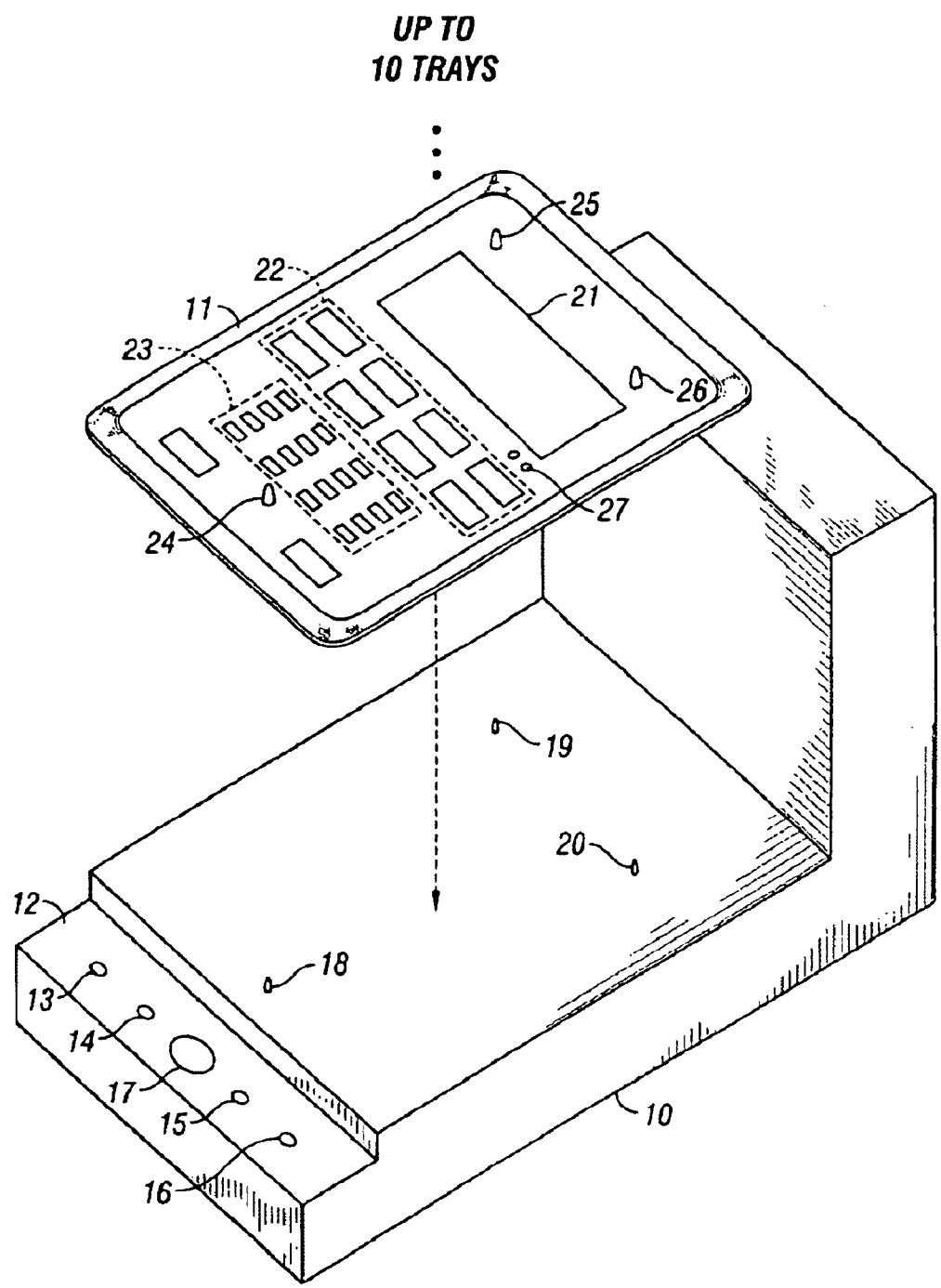
FIG. 1 is a perspective view of a base unit and survey tray in the preferred embodiment of the present invention.

FIG. 1 is a perspective view of a base unit and survey tray in the preferred embodiment of the present invention. The combination calculator, tip tray, and survey device includes a base unit 10 and a survey tray 11. Within a restaurant, up to 10 survey trays can be stacked on a single base unit. Once stacked, the trays can be simultaneously recharged. In addition, the trays can be simultaneously reprogrammed either locally or remotely, and data can be downloaded from the trays for transmission to local or remote databases. The base unit connects to either a PC through an RS232 interface, or to a Local Area Network (LAN) through a LAN interface, or to a remote computer and database through a modem. When a plurality of base units are used in a restaurant, the base unit connecting to the PC, LAN, or modem is referred to as the smart base. The other base units are referred to as extended bases, and they connect in daisy chain fashion (i.e., in series) to the smart base.

The base unit 10 includes a display panel 12 that includes a plurality of status indicator lights 13–16 and a reset button 17. The indicator lights may include, for example, an OK light 13, a Host Comm light 14 when data is being transferred to or from the base unit from the PC or other remote computer, a Tray Comm light 15 when data is being transferred to or from the trays from the base unit, and a Ready light 16 when the device has been initialized or reset and is ready for operation.

The base unit 10 includes three pins 18–20 that make contact with three contacts on the bottom surface of the survey tray. In the preferred embodiment, one pin provides DC power, another pin is Ground, and the third pin provides a path for data. The data pin may also be utilized to provide a reset command to the tray and any other trays stacked on top of it by presenting a negative voltage on the pin. In an alternative embodiment, there are only two pins, one for DC power and one for Ground. In this embodiment, the data is modulated on the power signal.

The survey tray 11 includes a display 21 such as an LCD display, a survey keypad 22, a calculator keypad 23, and three pins 24–26. The pins conduct the power, Ground, and data signals to subsequent trays stacked on top of the survey tray 11 through receptacles on the bottom of each tray that align with and contact the pins when the trays are stacked on top of each other. When the calculator mode is selected, the customer can use the survey tray to calculate a tip amount based on various percentages, or can use the tray to split the bill into different parts for each member of the party. When the survey mode is selected, questions are displayed on the display 21, and the customer answers them with the survey keypad 22. The calculator keypad may also be an alphanumeric keypad so that the customer may enter comments or other information such as their e-mail address. Each survey tray can store data from approximately 300–500 surveys, depending on the length of the survey, before the data must be downloaded. Indicator lights 27 provide an indication of how much memory space is available.

Although not shown in FIG. 1, and not visible to the customer, the survey tray also includes an internal paging transmitter that automatically pages the restaurant manager when a customer enters a response to a survey question that meets predetermined criteria. For example, For example, the manager may be paged if the customer enters a particularly good response indicating outstanding service or food, or if the customer enters a particularly bad response indicating that the service or food was unsatisfactory. In this way, the manager is alerted in time to visit the table to acknowledge the customer's satisfaction, or to assure the customer that the deficiency will be corrected the next time the customer comes to the restaurant.

The tray may also include a low power transmitter that transmits a low power signal that is sensed by a receiver located by the exit door of the restaurant such as a Radio Frequency Identification (RFID) tag. The receiver may trigger an alarm to indicate that a tray is being taken off the premises. This prevents loss of the trays due to theft.

In order to provide an incentive for customers to perform the survey, the restaurant management may implement a promotional feature that provides rewards such as free food or drinks to random customers or to customers at specific intervals. The odds of winning may be set by the management.

Figure 2:
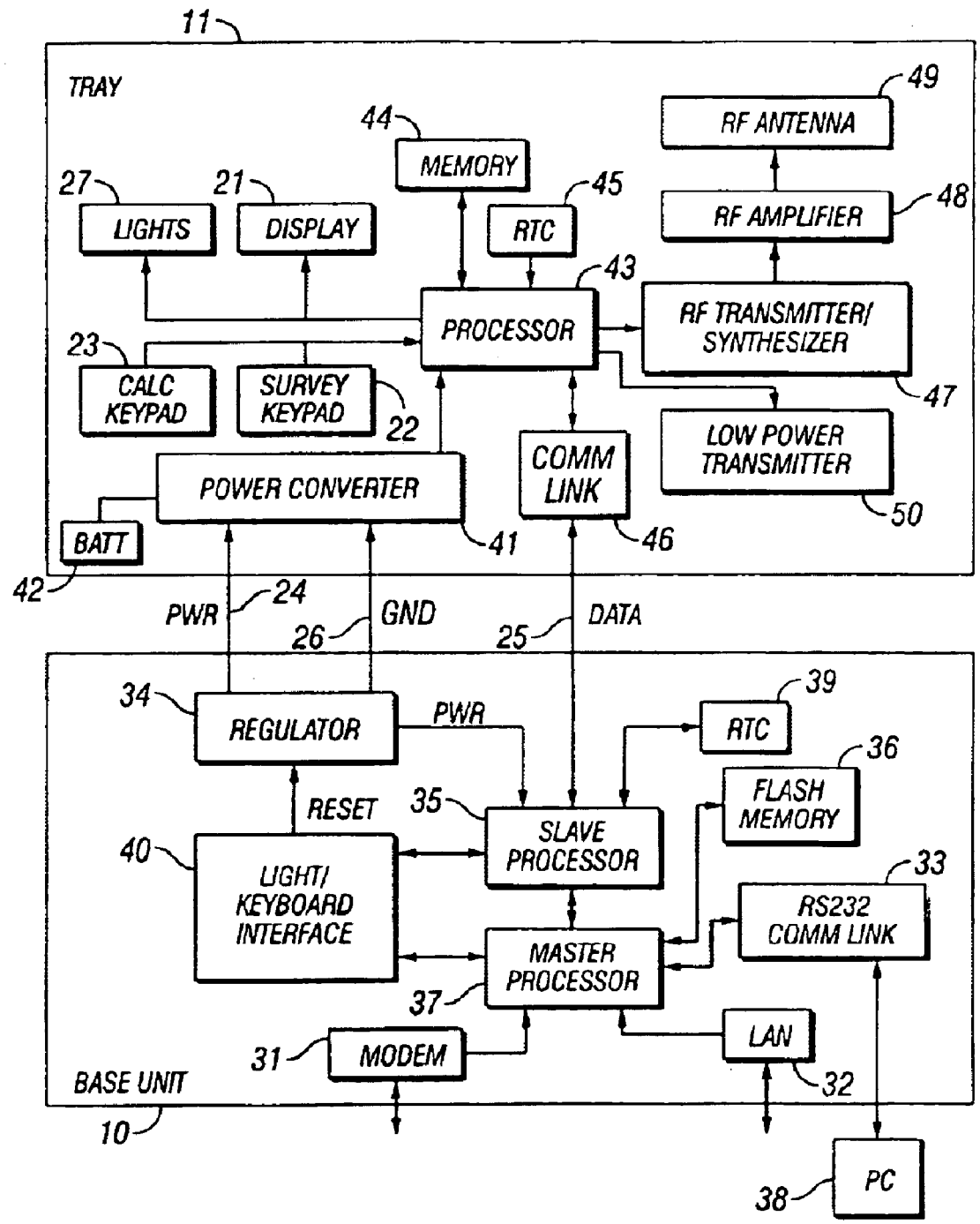
FIG. 2 is a simplified block diagram of the base unit and survey tray in the preferred embodiment of the present invention.

FIG. 2 is a simplified block diagram of the base unit 10 and survey tray 11 in the preferred embodiment of the present invention. On the back side of the base unit is a modem 31, a LAN connection 32, an RS232 serial port 33, and a DC power connector for a regulator 34. A Slave Processor 35 receives data through pin 25 and may pass it to a Master Processor 37 for storage in flash memory 36 or for transmission to a remote computer or database such as PC 38. A Real-Time Clock (RTC) 39 provides actual time of day to the Slave Processor. A light/keyboard interface 40 controls the status indicator lights 13–16 on the base unit, and receives the Reset command from the Reset button 17. The Reset command causes the Regulator 34 to switch the power and Ground signals being sent to a power converter 41 in the tray. This causes the tray processor 43 to erase the tray memory 44.

Once the survey tray has been reset and its battery 42 recharged, it is placed in standby mode by the server who may enter a server ID and a table number. The tray can then be used by a customer. The tray processor 43 collects inputs from the survey keypad 22 and the calculator keypad 23, and displays information on the display 21 and memory lights 27. Another RTC 45 provides time of day information to the tray processor. The customer responses to survey questions are stored in the tray memory 44 until they are downloaded through the Comm Link 46 to the base unit 10, PC 38, or other remote database or analysis function via the modem 31 or LAN connection 32. The Comm Link may be through a hard connection of a data pin 25 and a data receptacle on the tray, or the Link may be a wireless link. If the customer enters a response indicating particularly good or particularly bad service or food, the tray processor causes an RF transmitter/synthesizer 47 to send a paging signal to the restaurant manager. The signal is sent through an RF amplifier 48 and an RF antenna 49. As noted above, the tray may also include a low power transmitter 50 that transmits a low power signal that is sensed by a loss prevention receiver located by the exit door of the restaurant, such as an RFID tag.

Data may be downloaded simultaneously from all of the trays in a restaurant by stacking them on a base unit or a plurality of linked base units. This can be done locally from the PC 38, or remotely over the LAN or the Internet. In addition, the trays can be simultaneously reprogrammed with a new or updated survey. The trays may also be programmed at the Point-of-Sale (POS) terminal when the server clears the tab at the conclusion of the meal and prepares the ticket for the table. At this time, the tray is programmed with the identity of the server and the table number. In this way, the survey results can be correlated to each server. In addition, if the tray pages the manager because of a particularly good or bad response to a survey question, the tray sends the table number in the paging message so that the manager knows which table to visit.

The individual tray programming may be performed manually by the server, or the base unit may be interfaced to the POS terminal through the RS232 interface for automatic programming of the server ID and the table number. If automatic programming is used, the interface to the POS terminal may be utilized to identify specific food items that were ordered at that particular table. Specific survey questions can then be uploaded to the tray so that the customer is asked specifically about the quality of the food that he ordered. For example, if the customer ordered a steak, the survey may include a question about whether or not the steak was properly prepared the way the customer requested.

Another feature of the device is a disablement "virus" that may be disseminated to all of the trays if the restaurant does not properly honor its contract with the supplier of the trays. For example, a disablement code can be downloaded through the base unit(s) to the trays that disables the trays until a proper reset code is entered. Alternatively, the disablement code may be manually entered on the calculator keypad of an individual tray.

Figure 3:
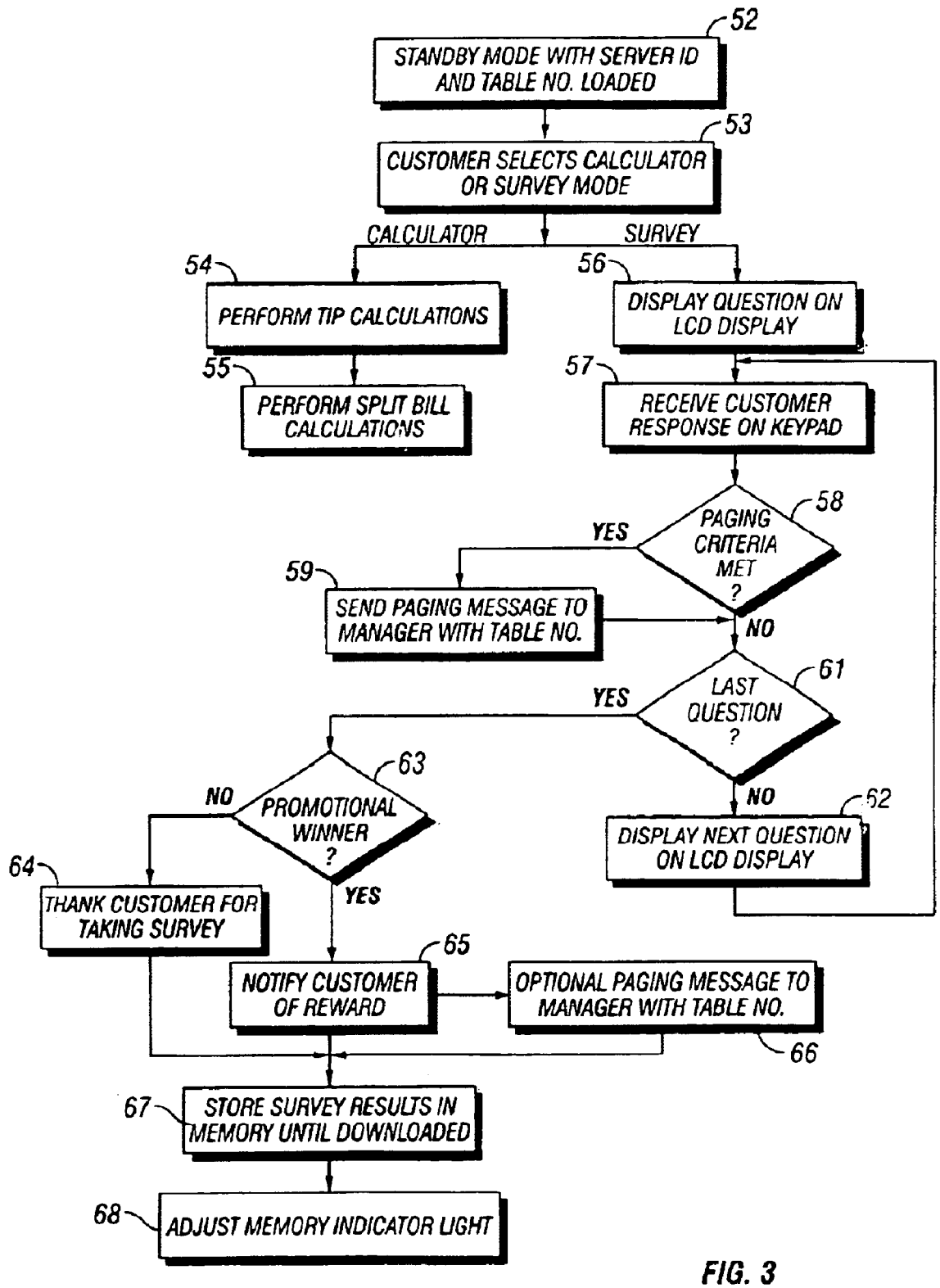
FIG. 3 is a flow chart of the steps taken by the present invention when a customer selects the calculator or survey mode of operation.

FIG. 3 is a flow chart of the steps taken by the present invention when a customer selects the calculator or survey mode of operation. At step 52, the survey tray 11 is in the standby mode, having been loaded with the server ID and the table number at the POS termimal. The tray may display a message about the restaurant's promotional program (i.e., possible rewards for taking the survey) on the LCD display while in the standby mode in order to provide an incentive for the customer to take the survey. At 53, the customer selects either the calculator mode or the survey mode of operation. If the calculator mode is selected, the tray performs tip calculations at 54 and split bill calculations at 55, or any other standard calculator functions.

If the customer selects the survey mode, the process moves from step 53 to step 56 where the first survey question is displayed on the LCD display 21. At 57, a customer response is received through the survey keypad 22 or through the alphanumeric keypad 23. At 58, it is determined whether or not the customer's response matched the predetermined criteria for paging the manager. For example, if the customer's choices are BEST, GOOD, FAIR, and POOR, and the customer enters BEST or POOR, the process moves to step 59 where the tray transmits a paging message to the restaurant manager with the table number. At 61, it is determined whether the question was the last survey question. If not, the next question is then displayed at step 62. The process then returns to step 57 and awaits the customer's response.

If it is determined at step 61 that the question was the last survey question, the process moves to step 63 where it is determined whether or not the customer is a winner in the restaurant's promotional program. This may be determined at random or at an interval set by the restaurant management (for example, every tenth customer). If the customer is not a winner, the customer is thanked at step 64 for taking the survey. If the customer is a winner, the customer is notified of the reward at 65. Optionally, the tray may page the manager at 66 so that the manager can congratulate the customer and/or bring a reward certificate to the table. At 67, the tray stores the survey results in memory 44 until the data is downloaded by the base unit 10. At 68, the tray adjusts the memory indicator light 27 to indicate the amount of memory space available.

It is thus believed that the operation and construction of the present invention will be apparent from the foregoing description. While the system, apparatus, and method shown and described has been characterized as being preferred, it will be readily apparent that various changes and modifications could be made therein without departing from the scope of the invention as defined in the following claims.

What is claimed is:

1. A system for obtaining and storing responses from a customer regarding a level of customer satisfaction, said system comprising:

a plurality of tip trays, each of said tip trays having means for obtaining and storing customer responses regarding the level of customer satisfaction; and a base unit having means for collecting the responses from the tip trays when the trays are stacked on the base unit, said base unit including a battery recharger connected to a power pin;

wherein each of the tip trays includes:

means for reporting the stored responses, said reporting means including a data receptacle that aligns with a data pin on the base unit when the tray is the bottommost tray in the stack of trays, and that aligns with a data pin on a lower tray stacked directly under the tray when the tray is not the bottommost tray in the stack of trays;

a transmitter connected to said obtaining and storing means selectively generating a signal in response to the obtaining and storing means obtaining a particularly good or bad response by a customer;

a rechargeable battery connected to a power receptacle aligned with the power pin of the base unit; and a power pin that aligns with a power receptacle on a higher tray stacked directly on top of the tray when the tray is not the topmost tray in the stack of trays;

wherein, when all of the trays are stacked on the base unit such that the data pins and data receptacles, and the power pins and power receptacles are in contact, the base unit collectively downloads customer responses from all of the stacked trays, and the recharger in the base unit recharges the batteries in all of the stacked trays simultaneously.

2. The system for obtaining and storing responses from a customer of claim 1 wherein the means within each of the trays for obtaining and storing responses from the customer includes:

a visual display that presents customer satisfaction survey questions to the customer;

a survey keypad for entering the customers responses to the survey questions;

a memory that stores the customer responses; and a tray processor that sends survey questions to the display, collects responses from the keypad, and sends the responses to the memory.

3. The system for obtaining and storing responses from a customer of claim 2 further comprising an external communications link in communication with the tray processor, said tray processor retrieving the responses from the memory and downloading the responses to the base unit utilizing the communications link.

4. The system for obtaining and storing responses from a customer of claim 1 wherein the base unit collecting means also includes a base unit processor connected to the data pin, said base unit processor using the data pin to program the tray processor with survey questions, and to download the customer responses from the tray.

5. The system for obtaining and storing responses from a customer of claim 1 further comprising an analysis unit remotely located from the base unit, wherein the base unit includes a communications port through which the collected responses are communicated to the analysis unit.

6. The system for obtaining and storing responses from a customer of claim 5 wherein the analysis unit is resident on a personal computer (PC), and the communications port comprises an RS232 interface.

7. The system for obtaining and storing responses from a customer of claim 6 wherein the analysis unit is resident on a remote computer, and the communications port communicates with the remote computer over a global computer network.

8. The system for obtaining and storing responses from a customer of claim 7 further comprising a plurality of base units connected in series to a smart base unit, said smart base unit being the base unit that is connected to the analysis unit.

* * * * *